(12) United States Patent
Ul Azam et al.

(10) Patent No.: US 12,266,072 B2
(45) Date of Patent: Apr. 1, 2025

(54) SCAN COLOR RESTORATION

(71) Applicant: FARO Technologies, Inc., Lake Mary, FL (US)

(72) Inventors: Raza Ul Azam, Ludwigsburg (DE); Daniel Pompe, Leonberg (DE); Sebastian Grottel, Ludwigsburg (DE)

(73) Assignee: FARO Technologies, Inc., Lake Mary, FL (US)

( * ) Notice: Subject to any disclaimer, the term of this patent is extended or adjusted under 35 U.S.C. 154(b) by 151 days.

(21) Appl. No.: 18/102,864

(22) Filed: Jan. 30, 2023

(65) Prior Publication Data

US 2023/0245409 A1 Aug. 3, 2023

Related U.S. Application Data

(60) Provisional application No. 63/305,725, filed on Feb. 2, 2022.

(51) Int. Cl.
*G06T 19/20* (2011.01)
*G01S 17/894* (2020.01)
(Continued)

(52) U.S. Cl.
CPC ............ *G06T 19/20* (2013.01); *G01S 17/894* (2020.01); *G06T 5/50* (2013.01); *G06T 7/90* (2017.01);
(Continued)

(58) Field of Classification Search
CPC .. G06T 19/20; G06T 7/90; G06T 5/50; G06T 2207/10024; G06T 2207/10028;
(Continued)

(56) References Cited

U.S. PATENT DOCUMENTS 8,488,877 B1 * 7/2013 Owechko ............... G06V 20/64
382/165
2006/0188143 A1 * 8/2006 Strassenburg-Kleciak ..................
G06T 7/30
382/154

(Continued)

FOREIGN PATENT DOCUMENTS

EP  3373251 A1  9/2018
EP  3588446 A2  1/2020

OTHER PUBLICATIONS

Buyssens et al., Depth-Aware Patch-based Image Disocclusion for Virtual View Synthesis. SIGGRAPH Asia 2015 Technical Briefs. 5 pages.

(Continued)

*Primary Examiner* — Terrell M Robinson
(74) *Attorney, Agent, or Firm* — McCarter & English, LLP; Dave S. Christensen

(57) ABSTRACT

Techniques are described to generate a 3D scene by mapping a point cloud with a 2D image, and colorize portions of the 3D scene synthetically. An input is received to select, from the 3D scene, a portion to be colorized synthetically. The colorizing includes generating a reflectance image based on an intensity image of the point cloud. The colorizing further includes generating an occlusion mask that identifies the selected portion in the reflectance image. The colorizing further includes estimating, using a trained machine learning model, a color for each of the one or more points in the selected portion based on the reflectance image, the occlusion mask, and the 2D image. The 3D scene is updated by using the estimated colors from the trained machine learning model to colorize the selected portion.

15 Claims, 12 Drawing Sheets
(6 of 12 Drawing Sheet(s) Filed in Color)

(51) Int. Cl.
*G06T 5/50* (2006.01)
*G06T 7/90* (2017.01)

(52) U.S. Cl.
CPC .............. *G06T 2207/10024* (2013.01); *G06T 2207/10028* (2013.01); *G06T 2207/20021* (2013.01); *G06T 2207/20081* (2013.01); *G06T 2207/20084* (2013.01); *G06T 2210/56* (2013.01); *G06T 2219/2012* (2013.01)

(58) Field of Classification Search
CPC . G06T 2207/20021; G06T 2207/20084; G06T 2210/56; G06T 2219/2012; G01S 17/894
See application file for complete search history.

(56) References Cited

U.S. PATENT DOCUMENTS

| | | | | |
|---|---|---|---|---|
| 2009/0168045 | A1* | 7/2009 | Lin ..................... | G01S 7/4817 |
| | | | | 356/4.01 |
| 2009/0323121 | A1* | 12/2009 | Valkenburg .......... | G01C 15/002 |
| | | | | 358/1.18 |
| 2013/0070250 | A1* | 3/2013 | Ditte .................... | G01C 22/025 |
| | | | | 356/445 |
| 2017/0148222 | A1* | 5/2017 | Holzer ................. | H04N 23/698 |
| 2018/0014002 | A1 | 1/2018 | Vollrath et al. | |
| 2019/0035159 | A1* | 1/2019 | Tran ..................... | G16H 40/63 |
| 2019/0130630 | A1* | 5/2019 | Ackerson ............. | H04N 13/111 |
| 2019/0311546 | A1* | 10/2019 | Tay ..................... | G06T 7/521 |
| 2020/0342652 | A1* | 10/2020 | Rowell ................. | G06V 10/82 |

OTHER PUBLICATIONS

Krishnamoorthy et al., An Enhanced Method for Object Removal Using Exemplar-based Image Inpainting. 2017 International Conference on Computer Communication and Informatics, 5 pages.
Shih et al., 3D Photography using Context-aware Layered Depth Inpainting. IEEE Conference on Computer Vision and Pattern Recognition (CVPR), 2020, 15 pages.
Xie et al., Image Inpainting with Learnable Bidirectional Attention Maps. 2019 IEEE/CVF International Conference on Computer Vision, 10 pages.
Zeng et al., Learning Pyramid-Context Encoder Network for High-Quality Image Inpainting. 2019 IEEE/CVF Conference on Computer Vision and Pattern Recognition, 9 pages.

* cited by examiner

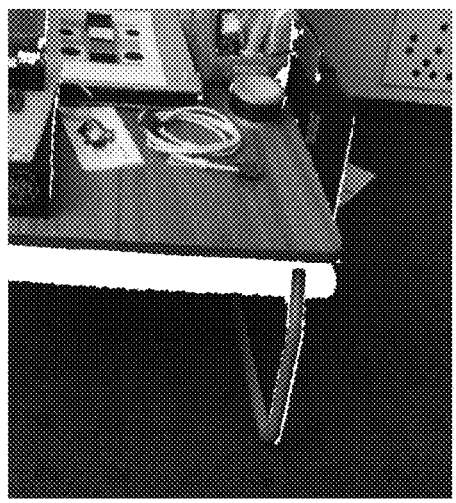
Window with occluded color 1102
Window with occluded portion colorized synthetically 1104
FIG. 11
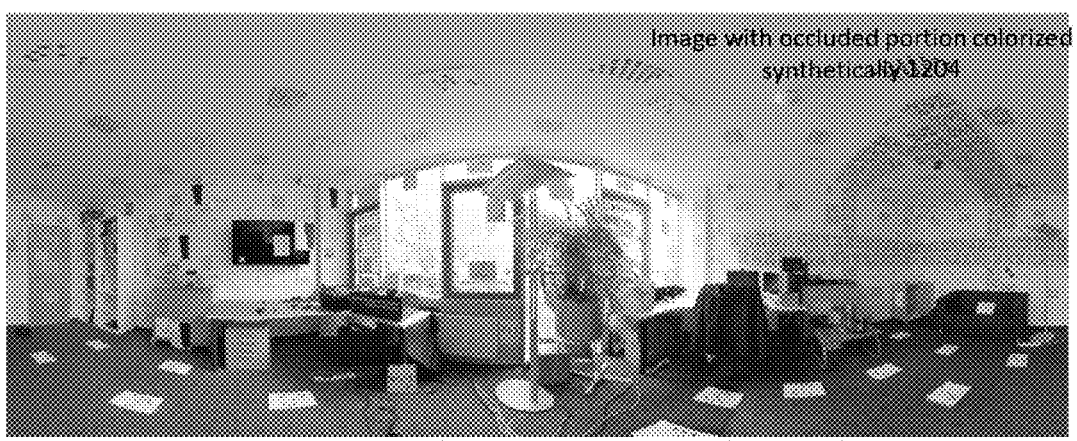
FIG. 12

SCAN COLOR RESTORATION

CROSS-REFERENCE TO RELATED APPLICATIONS

The present application is a nonprovisional application of, and claims the benefit of, U.S. Provisional Application Ser. No. 63/305,725 filed on Feb. 2, 2022 entitled Scan Color Restoration, the contents of which are incorporated by reference herein in its entirety.

BACKGROUND

The subject matter disclosed herein relates to computing technology and particularly computer vision technology for restoring scan color using machine learning. Further, the subject matter disclosed herein relates to and improves three-dimensional (3D) measurement systems that include a 3D scanner and a two-dimensional (2D) camera, where the 3D scanner captures 3D data of surfaces in a surrounding environment, and the 2D camera captures images of the surrounding environment.

The creation of digital 3D scenes for existing environments and structures is desirable as it allows the size and shape of the environment to be used in many processes. For example, a floorplan may be desirable to allow construction drawings to be prepared during a renovation. Such floorplans may find other uses, such as in documenting a building for a fire department or documenting a crime scene.

Existing measurement systems typically use a 3D scanner that determines coordinates of surfaces in the environment by both emitting light and capturing a reflection to determine a distance or by triangulation using cameras. These 3D scanner devices are, in some cases, mounted to a movable structure, such as a cart, and moved through the building to generate a digital representation of the building. Alternatively, or in addition, the scanning device is handheld. These systems tend to be complex and require specialized personnel to perform the scan. Further, the scanning equipment, including the movable structure, can become bulky. This could further delay the scanning process in time-sensitive situations, such as a crime or accident scene investigation.

While existing 3D measurement systems are suitable for their intended purposes, what is needed is a 3D measurement system having certain features of aspects of the present disclosure.

BRIEF DESCRIPTION

According to one or more aspects of the technical solutions described herein, a system includes a three-dimensional (3D) scanner, a camera with a viewpoint that is different from a viewpoint of the 3D scanner, and one or more processors coupled with the 3D scanner and the camera. The one or more processors access a point cloud captured by the 3D scanner, the point cloud comprises depth values of points in a surrounding environment. The one or more processors access a 2D image captured by the camera, the 2D image comprises a plurality of pixels representing color information of the points in the surrounding environment. The one or more processors generate a 3D scene by mapping the point cloud with the 2D image. The one or more processors receive an input that selects, from the 3D scene, a portion to be colorized synthetically. The one or more processors colorize the one or more points in the selected portion in the 3D scene. The colorizing includes generating a reflectance image based on an intensity image of the point cloud. The colorizing further includes generating an occlusion mask that identifies the selected portion in the reflectance image. The colorizing further includes estimating, using a trained machine learning model, a color for each of the one or more points in the selected portion based on the reflectance image, the occlusion mask, and the 2D image. The one or more processors update the 3D scene by using the estimated colors from the trained machine learning model to colorize the selected portion.

In addition to one or more of the features described herein, or as an alternative, further embodiments of the system may include the trained machine learning model being a generative adversarial neural network.

In addition to one or more of the features described herein, or as an alternative, further embodiments of the system may include the 2D image being a panoramic image.

In addition to one or more of the features described herein, or as an alternative, further embodiments of the system may include the 3D scene comprising a plurality of occluded regions, and each occluded region is colorized using a sliding window.

In addition to one or more of the features described herein, or as an alternative, further embodiments of the system may include the colorizing of the occluded portion of the 3D scene comprising transforming the 2D image into cube map representation.

In addition to one or more of the features described herein, or as an alternative, further embodiments of the system may include the selected portion being an occluded portion of the surrounding environment that is visible from the 3D scanner, and is not visible from the camera.

In addition to one or more of the features described herein, or as an alternative, further embodiments of the system may include the selected portion being an artifact that is to be removed from the 3D scene.

In addition to one or more of the features described herein, or as an alternative, further embodiments of the system may include the trained machine learning model being trained using synthetically generated data from previously captured 3D images.

A computer-implemented method includes accessing a point cloud captured by a 3D scanner, the point cloud comprises depth values of points in a surrounding environment. The method further includes accessing a 2D image captured by a camera, the 2D image comprises a plurality of pixels representing color information of the points in the surrounding environment. The method further includes generating a 3D scene by mapping the point cloud with the 2D image. The method further includes receiving an input that selects, from the 3D scene, a portion to be colorized synthetically. The method further includes colorizing the one or more points in the selected portion in the 3D scene. The colorizing includes generating a reflectance image based on an intensity image of the point cloud. The colorizing further includes generating an occlusion mask that identifies the selected portion in the reflectance image. The colorizing further includes estimating, using a trained machine learning model, a color for each of the one or more points in the selected portion based on the reflectance image, the occlusion mask, and the 2D image. The method further includes updating the 3D scene by using the estimated colors from the trained machine learning model to colorize the selected portion. In one or more aspects, the 2D image is a panoramic image.

In addition to one or more of the features described herein, or as an alternative, further embodiments of the computer implemented method may include the 3D scene comprises a plurality of occluded regions, and each occluded region is colorized using a sliding window.

In addition to one or more of the features described herein, or as an alternative, further embodiments of the computer implemented method may include the colorizing of the occluded portion of the 3D scene further comprising transforming the 2D image into cube map representation.

In addition to one or more of the features described herein, or as an alternative, further embodiments of the computer implemented method may include the selected portion being an occluded portion of the surrounding environment that is visible from the 3D scanner, and is not visible from the camera.

In addition to one or more of the features described herein, or as an alternative, further embodiments of the computer implemented method may include the selected portion being an artifact that is to be removed from the 3D scene.

In addition to one or more of the features described herein, or as an alternative, further embodiments of the computer implemented method may include the trained machine learning model being trained using synthetically generated data from previously captured 3D images.

According to one or more aspects, a computer program product includes a memory device with computer executable instructions stored thereon, the computer executable instructions when executed by one or more processors cause the one or more processors to perform a method. The method includes accessing a point cloud captured by a 3D scanner, the point cloud comprises depth values of points in a surrounding environment. The method further includes accessing a 2D image captured by a camera, the 2D image comprises a plurality of pixels representing color information of the points in the surrounding environment. The method further includes generating a 3D scene by mapping the point cloud with the 2D image. The method further includes receiving an input that selects, from the 3D scene, a portion to be colorized synthetically. The method further includes colorizing the one or more points in the selected portion in the 3D scene. The colorizing includes generating a reflectance image based on an intensity image of the point cloud. The colorizing further includes generating an occlusion mask that identifies the selected portion in the reflectance image. The colorizing further includes estimating, using a trained machine learning model, a color for each of the one or more points in the selected portion based on the reflectance image, the occlusion mask, and the 2D image. The method further includes updating the 3D scene by using the estimated colors from the trained machine learning model to colorize the selected portion.

In addition to one or more of the features described herein, or as an alternative, further embodiments of the computer program product may include the 3D scene comprises a plurality of occluded regions, and each occluded region is colorized using a sliding window.

In addition to one or more of the features described herein, or as an alternative, further embodiments of the computer program product may include the colorizing of the occluded portion of the 3D scene further comprises transforming the 2D image into cube map representation.

In addition to one or more of the features described herein, or as an alternative, further embodiments of the computer program product may include the selected portion being an artifact that is to be removed from the 3D scene.

In addition to one or more of the features described herein, or as an alternative, further embodiments of the computer program product may include the trained machine learning model being trained using synthetically generated data from previously captured 3D images.

These and other advantages and features will become more apparent from the following description taken in conjunction with the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

FIG. 11 and FIG. 12 depict example scenarios without and with using technical solutions described herein when generating 3D scenes using a 3D measurement device.

Figure 1:
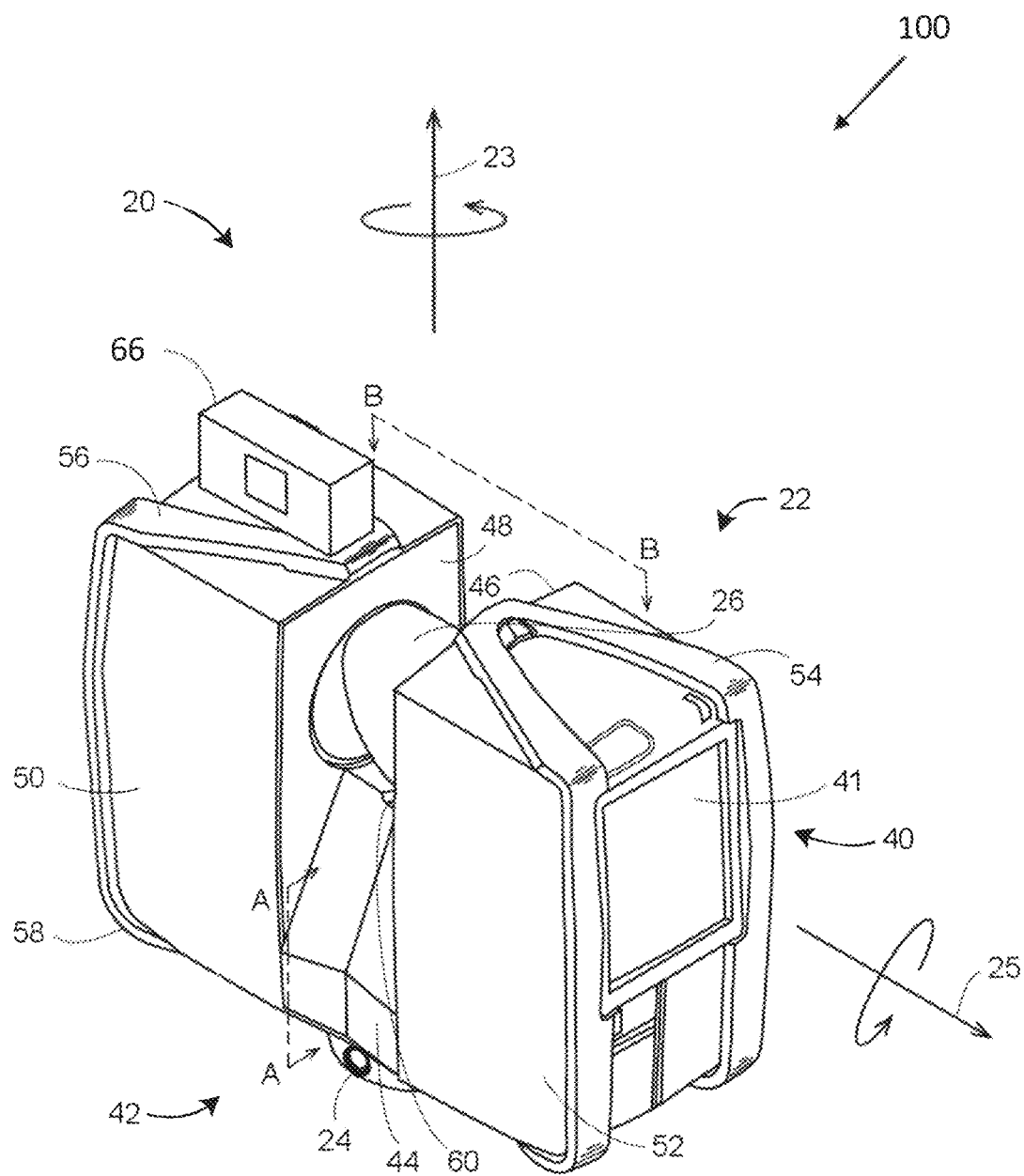
FIG. 1 is a perspective view of a laser scanner in accordance with one or more aspects.

The detailed description explains aspects of the invention, together with advantages and features, by way of example with reference to the drawings.

DETAILED DESCRIPTION

Aspects herein relate to a system that includes a three-dimensional (3D) measurement device and at least one camera to capture color images. The 3D measurement device can include a 3D scanner. The 3D scanner captures a point cloud representing a scene in a field-of-view (FOV) of the 3D scanner. The point cloud is a set of scan points, each scan point being captured from a surface in the scene. The scan points have 3D coordinates representing their location in the scene. The system, which can also be referred to as a 3D scanning system, or a scanning system, uses the camera to acquire a 2D image of the scene, for example, a color image using red-green-blue (RGB) or any other coloring scheme. The point cloud and the color image(s) are combined (e.g., registered) to generate a 3D image of the scene that provides 3D dimensional (x, y, z) and color information.

The 3D image can be stored as a digital file, and can be manipulated using one or more computer programs, for example, for architecture, digital modeling, forensic analysis, computer-aided designing, etc.

Aspects described herein provide technical solutions to apply a machine learning model (e.g., deep learning, generative neural networks, etc.) for colorizing points in a 3D image (or 3D scene). In one or more aspects, training the machine learning model is improved by synthetically generating a training dataset that can be used to train the machine learning model. Aspects described herein also facilitate removing specific portions (e.g., faces, license plates, specific objects, noisy data, etc.) in the captured 3D image and colorizing the removed portion based on the surrounding environment.

Typically, a 3D scanner, such as a time-of-flight (TOF) laser scanner, steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target. While a TOF laser scanner is generally used as an example 3D laser scanner when describing technical solutions herein, other types of laser scanners can also be used.

A TOF laser scanner is a scanner in which the distance to a target point is determined based on the speed of light in air between the scanner and a target point. Laser scanners are typically used for scanning closed or open spaces such as interior areas of buildings, industrial installations, and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored, and sent to a processor or processors to generate a 3D image representing the scanned area or object.

Generating the 3D image requires at least three values for each data point. These three values may include the distance and two angles, or may be transformed values, such as the x, y, z coordinates. For example, z can represent a depth of the data point from the 3D scanner (or an arbitrary origin relative to the 3D scanner).

The 3D scanning systems further include a color 2D camera. The 2D camera can be mounted on the 3D scanner. Alternatively, the 2D camera is mounted on a separate mount at a predetermined offset from the 3D scanner. The 2D camera gathers digital camera images of the environment. In some aspects, the 2D camera presents the digital camera images to an operator of the 3D scanning system. By viewing the digital camera images, the operator of the 3D scanning system can determine the field of view of the measured volume and adjust settings on the 3D scanner to measure over a larger or smaller region of space. In addition, the camera images may be transmitted to a processor to add color to the 3D image.

A technical challenge with 3D image generation is that there may be missing 3D information. For example, the missing 3D information may be a result of points in the scene for which the 3D scanner cannot capture depth. Examples of such points include points on surfaces of objects that are very distant (from the 3D scanner) in the scene, for example, the sky, or other objects from which the reflected light does not reach the 3D scanner in a predetermined duration from when the light is emitted. Additionally, the missing 3D information can be a result of points in the scene (i.e., surrounding environment being captured) that are occluded from the 3D scanner, for example, because of other objects being in the way. However, in some cases, such points that are occluded from the 3D scanner may be visible to the 2D camera due to parallax effect, i.e., an offset in position of the 3D scanner and the 2D camera in the scanning system. Existing solutions address such technical challenges by capturing the occluded points from other viewpoints (i.e., multiple captures). Instead, technical solutions described herein facilitate generating a realistic 3D scene with a single capture, where points corresponding to the missing 3D information are colorized using the machine learning model.

Another technical challenge with 3D image generation is that there may be missing color information. For example, the missing color information may be a result of points in the point cloud for which the 2D camera cannot capture color. The missing color information can be a result of points in the scene (i.e., surrounding environment being captured) that are occluded from the 2D camera, for example, because of other objects being in the way. However, in some cases, such points that are occluded from the 2D camera scanner may be visible to the 3D scanner due to the parallax effect, i.e., an offset in position of the 3D scanner and the 2D camera in the scanning system. Existing solutions address such technical challenges by capturing the occluded points from other viewpoints (i.e., multiple captures). Instead, technical solutions described herein facilitate generating a realistic 3D scene with a single capture, where the missing color information is computed using the machine learning model.

A technical challenge exists in training the machine learning model for computing the color in the case of the missing 3D information and the missing color information. In machine learning, "training" a machine learning model refers to the process of facilitating the machine learning model to automatically learn patterns based on data. These patterns are statistically learned in supervised learning in which the machine learning model is informed of "correct" and/or "incorrect" results by comparison with ground truth information. To train a machine learning model, at least a certain amount of training data has to exist, where the training data provides ground truth that can be compared and iteratively achieved by the outputs from the machine learning model. However, such ground truth information is not available. Aspects described herein address such technical challenges by synthetically generating data by changing viewpoints of the 2D camera, detecting occlusions, and consequently generating occlusion masks.

Figure 2:
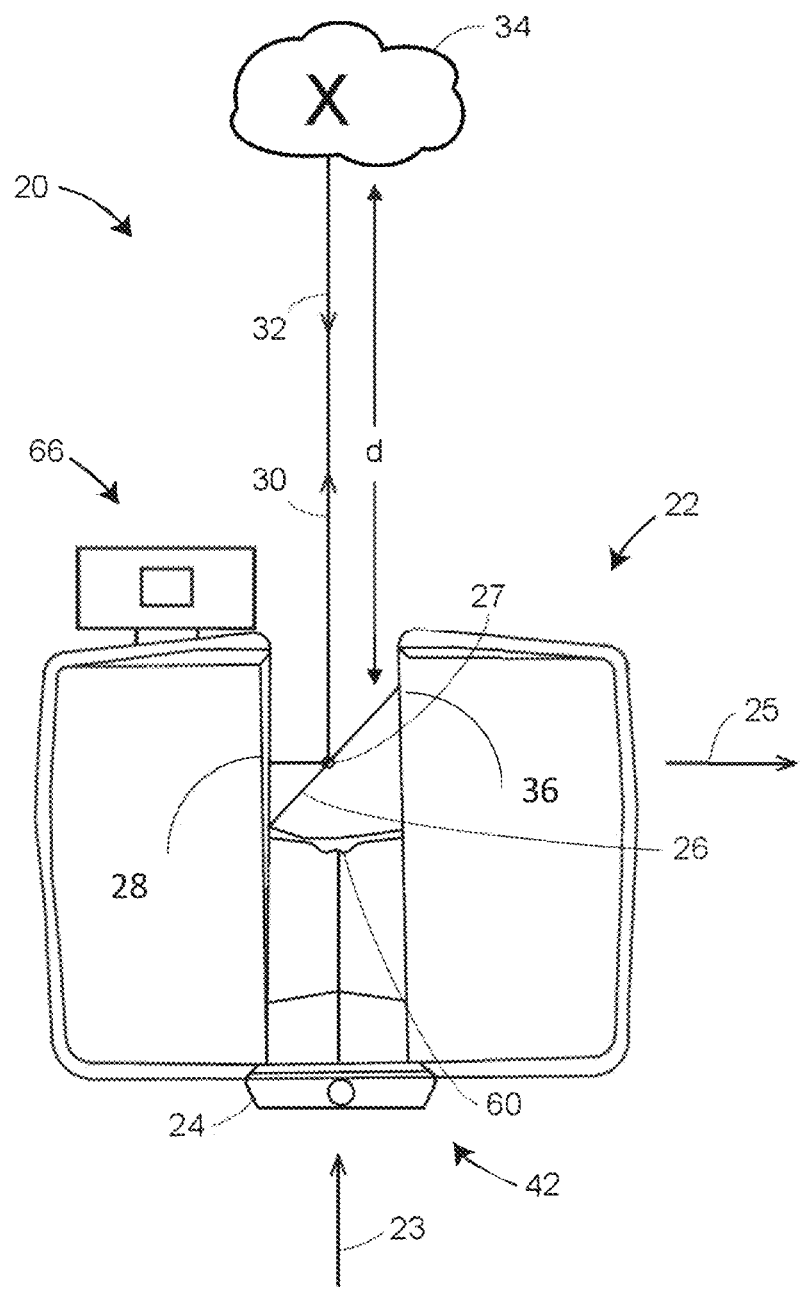
FIG. 2 is a side view of the laser scanner illustrating a method of measurement according to one or more aspects.

Referring now to FIGS. 1-2, a measurement device 100 includes a laser scanner 20 for optically scanning and measuring the environment surrounding the measurement device 100. The measurement device 100 further includes a camera 66 to capture color images of the surroundings.

The laser scanner 20 is an example 3D scanner according to one or more aspects of the technical solutions described herein. It should be noted that the 3D scanner can be other types of devices than the laser scanner 20 of FIG. 1. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms "azimuth axis" and "zenith axis" may be substituted for the terms "vertical axis" and "horizontal axis," respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X (FIG. 2), a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received intensity (equivalent to the term "brightness" or "optical power") value. The gray-scale value may be determined at least in part, for example, by integration of the bandpass-filtered and amplified signal in the light receiver 36 over a measuring period attributed to the object point X. As will be discussed in more detail herein, the intensity value may be used to enhance color images that are used to colorize the scanned data.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other aspects, the yokes 54, 56 may include additional features, such as handles to facilitate the carrying of the laser scanner 20 or attachment points for accessories for example.

On top of the traverse 44, a prism 60 may be provided. The prism extends parallel to the walls 46, 48. In the exemplary embodiment, the prism 60 is integrally formed as part of the carrying structure 42. In other aspects, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In one or more aspects, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In one or more aspects, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In one or more aspects, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In one or more aspects, the auxiliary image acquisition device 66 is a color camera. The color camera can be equipped with a rectilinear lens, an ultrawide-angle lens, sometimes referred to as a "fisheye camera," or any other such lens to capture the color information of the one or more surfaces in the volume captured by the laser scanner 20. In one or more examples, the camera 66 is a panoramic camera, such as the RICOH® THETA Z1™. Herein, the auxiliary image acquisition device 66 is also referred to as a "camera," however, as noted, can include other types of devices listed above. The examples described herein use the panoramic camera to acquire the color images. However, in other aspects, a different type of camera 66 may be used.

In one or more aspects, the camera 66 is rotated by a motor 138 and the angular/rotational position of the camera 66 can be measured by angular encoder 132. The camera 66 obtains 2D images of the scanned area to capture color data to add to the captured point cloud. The camera 66 is affixed to the 3D measurement device 100 at a known position with an offset relative to the 3D scanner 20. The offset between the 3D scanner 20 and the camera 66 facilitates the camera 66 to capture at least some of the points that may be occluded from the 3D scanner 20, and vice-versa.

Figure 3:
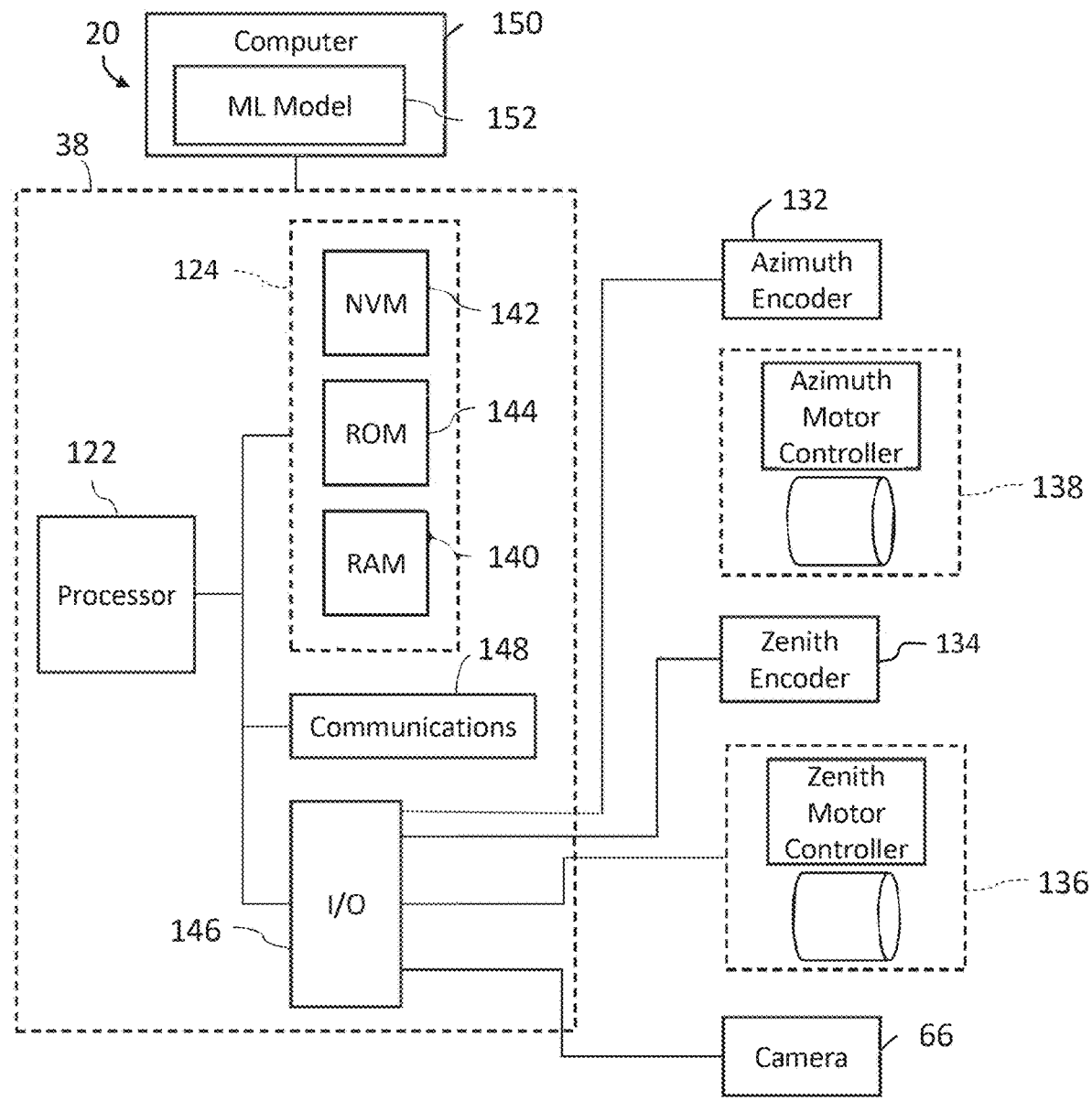
FIG. 3 illustrates a schematic illustration of the laser scanner of FIG. 1 according to one or more aspects.

Referring now to FIG. 3 with continuing reference to FIGS. 1-2, elements are shown of the measurement device 100. Controller 38 is a suitable electronic device capable of accepting data and instructions, executing the instructions to process the data, and presenting the results. The controller 38 includes one or more processing elements 122. The processors may be microprocessors, field programmable gate arrays (FPGAs), digital signal processors (DSPs), and generally any device capable of performing computing functions. The one or more processors 122 have access to memory 124 for storing information.

Controller 38 can convert the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to distance to an object, images of the environment, images acquired by the camera 66, angular/rotational measurements by a first or azimuth encoder 132, and angular/rotational measurements by a second axis or zenith encoder 134.

In general, controller 38 accepts data from encoders 132, 134, light receiver 36, light source 28, and camera 66 and is given certain instructions for the purpose of generating a 3D point cloud of a scanned environment. Controller 38 provides operating signals to the light source 28, light receiver 36, camera 66, zenith motor 136, and azimuth motor 138. The controller 38 compares the operational parameters to predetermined variances and if the predetermined variance is exceeded, generates a signal that alerts an operator to a condition. The data received by the controller 38 may be displayed on a user interface 40 coupled to controller 38. The user interface 40 may be one or more LEDs (light-emitting diodes) 82, an LCD (liquid-crystal diode) display, a CRT (cathode ray tube) display, a touchscreen display or the like. A keypad may also be coupled to the user interface for providing data input to controller 38. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet Protocol), RS-232, ModBus, and the like. Additional systems 20 may also be connected to LAN with the controllers 38 in each of these systems 20 being configured to send and receive data to and from remote computers and other systems 20. The LAN may be connected to the Internet. This connection allows controller 38 to communicate with one or more remote computers connected to the Internet.

The processors 122 are coupled to memory 124. The memory 124 may include random access memory (RAM) device 140, a non-volatile memory (NVM) device 142, and a read-only memory (ROM) device 144. In addition, the processors 122 may be connected to one or more input/output (I/O) controllers 146 and a communications circuit 148. In one or more aspects, the communications circuit 92 provides an interface that allows wireless or wired communication with one or more external devices or networks, such as the LAN discussed above.

Controller 38 includes operation control methods described herein, which can be embodied in application code. For example, these methods are embodied in computer instructions written to be executed by processors 122, typically in the form of software. The software can be encoded in any language, including, but not limited to, assembly language, VHDL (Verilog Hardware Description Language), VHSIC HDL (Very High Speed I.C. Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (Hypertext Markup Language), Python, Ruby and any combination or derivative of at least one of the foregoing.

In some aspects, the controller 38 provides the data captured by the measurement device 100, i.e., the point cloud(s) and captured image(s) to a computer 150. The controller 38 communicates with the computer via a wired or wireless network. The computer 150 can be a desktop computer, a laptop computer, a tablet computer, a phone, or any other computing device. The computer 150 is located locally with the 3D measurement device 100 in some aspects. In other aspects, the computer 150 is remotely located in relation to the 3D measurement device 100.

The computer 150 processes the data that is captured by the measurement device 100, as described herein. In some aspects, the computer 150 includes a machine learning model 152 that processes the captured data, i.e., the 3D data from the 3D scanner 20 and the monocular image from the camera 66, to generate the 3D image/scene. The processing includes computing the depth map for the captured image using the machine learning model 152 and using the values from the depth map for the points for which the 3D scanner 20 is not able to capture depth values. In some aspects, the processing is performed in substantially real-time, i.e., as the data is being captured by the 3D measurement device; in other aspects, the processing is performed in an offline manner.

Figure 4:
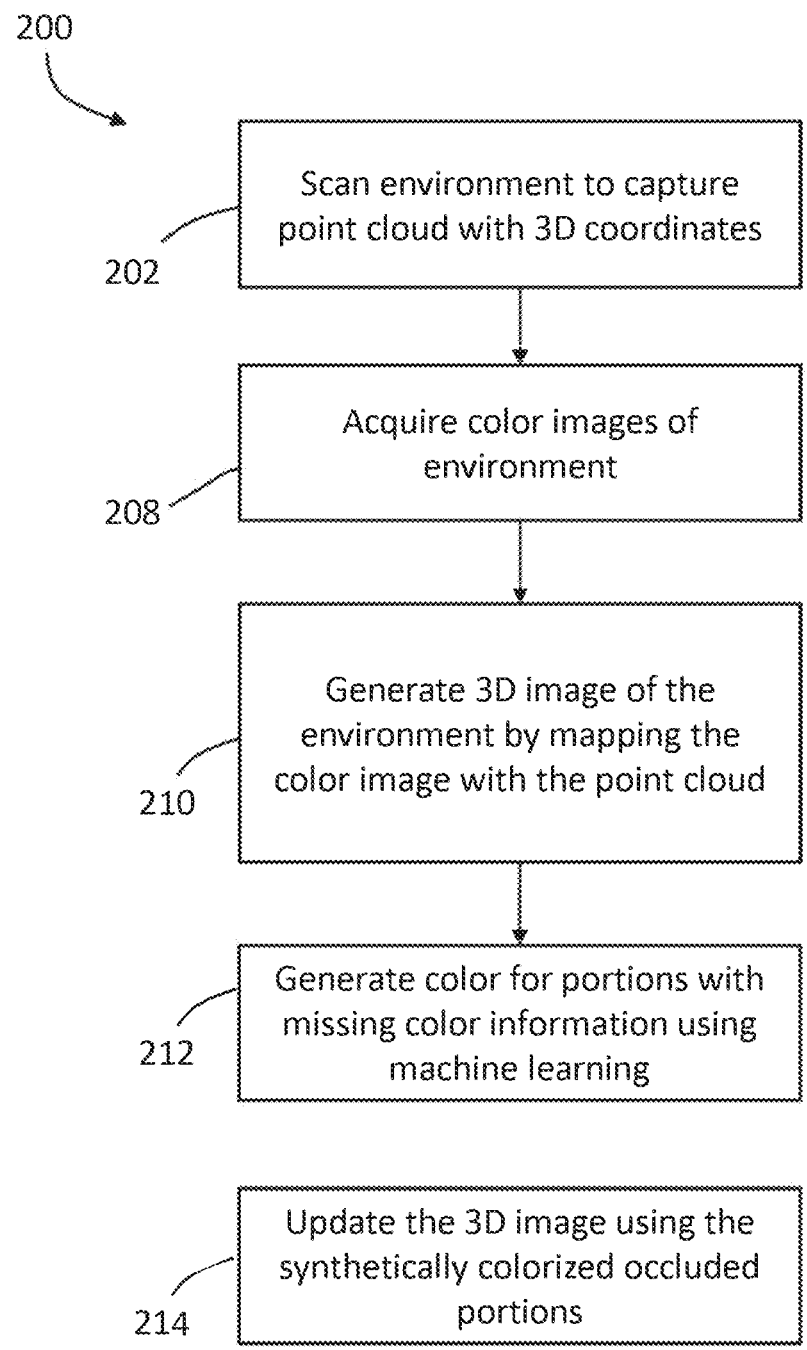
FIG. 4 depicts a flowchart of a method for generating a 3d scene/image using a measurement device according to one or more aspects.

Referring now to FIG. 4, one or more aspects of a method 200 are shown for generating a scan of the environment with the system 100. The method 200 begins in block 202 where the environment in which the scanner 20 is positioned is scanned to capture a point cloud representation of the scene. As described herein, the volume (i.e., scene or scan area) around the laser scanner 20 is performed by rotating the rotary mirror 26 relatively quickly about axis 25 while rotating the measuring head 22 relatively slowly about axis 23, thereby moving the assembly in a spiral pattern. Thus, for each light beam emitted, a distance value and the angles of the mirror 26 and the measurement head 22 are determined. Thus, a 3D coordinate of a scan point in the environment may be determined for each emitted and received light beam. Further, for each light beam, an intensity value of the returned light beam is measured. The light beams are emitted and received as the measurement head 22 is rotated 180 degrees about the axis 23.

The method 200 further includes, at block 208, acquiring a 2D color image ("2D image") of the environment. The 2D image is a panoramic image in one or more aspects. The 2D image may be acquired substantially concurrently with the point cloud in some aspects. In other aspects, the 2D image is captured before, or after capturing the point cloud. The 2D image is acquired by the auxiliary image acquisition device 66. The 2D image is captured with the 3D measurement device 100 at the same position as it was when capturing the point cloud. In one or more aspects, the 2D image is in an RGB color model. In other aspects, other color models, e.g., cyan, magenta, and yellow (CMY), or cyan, magenta, yellow, and black (CMYK), or any other color model, can be used.

Once the color data is acquired, the method 200 includes, at block 210, generating a colorized 3D image by mapping the 2D coordinates in the 2D image captured by the camera 66 with the 3D coordinates in the point cloud captured by the scanner 20. The mapping can be performed using any known technique. For example, the mapping includes registering the 2D image and the point cloud to a common coordinate system. Some examples of registering captured data to a common coordinate system are described in U.S. Published Patent Application No. 2012/0069352 ('352), and in U.S. Pat. No. 9,513,107B2 ('107), the contents of which are incorporated herein by reference. In some aspects, the 2D image is registered to the coordinate system of the point cloud. Alternatively, the point cloud is registered to the coordinate system of the 2D image. Once registered to a common coordinate system, a scan point from the point cloud can be back-projected into the 2D image. It is understood that in some aspects of the technical solutions described herein, techniques other than those described in '352 and the '107 are used to register the 2D image and the point cloud to a common/joint coordinate system.

Figure 5:
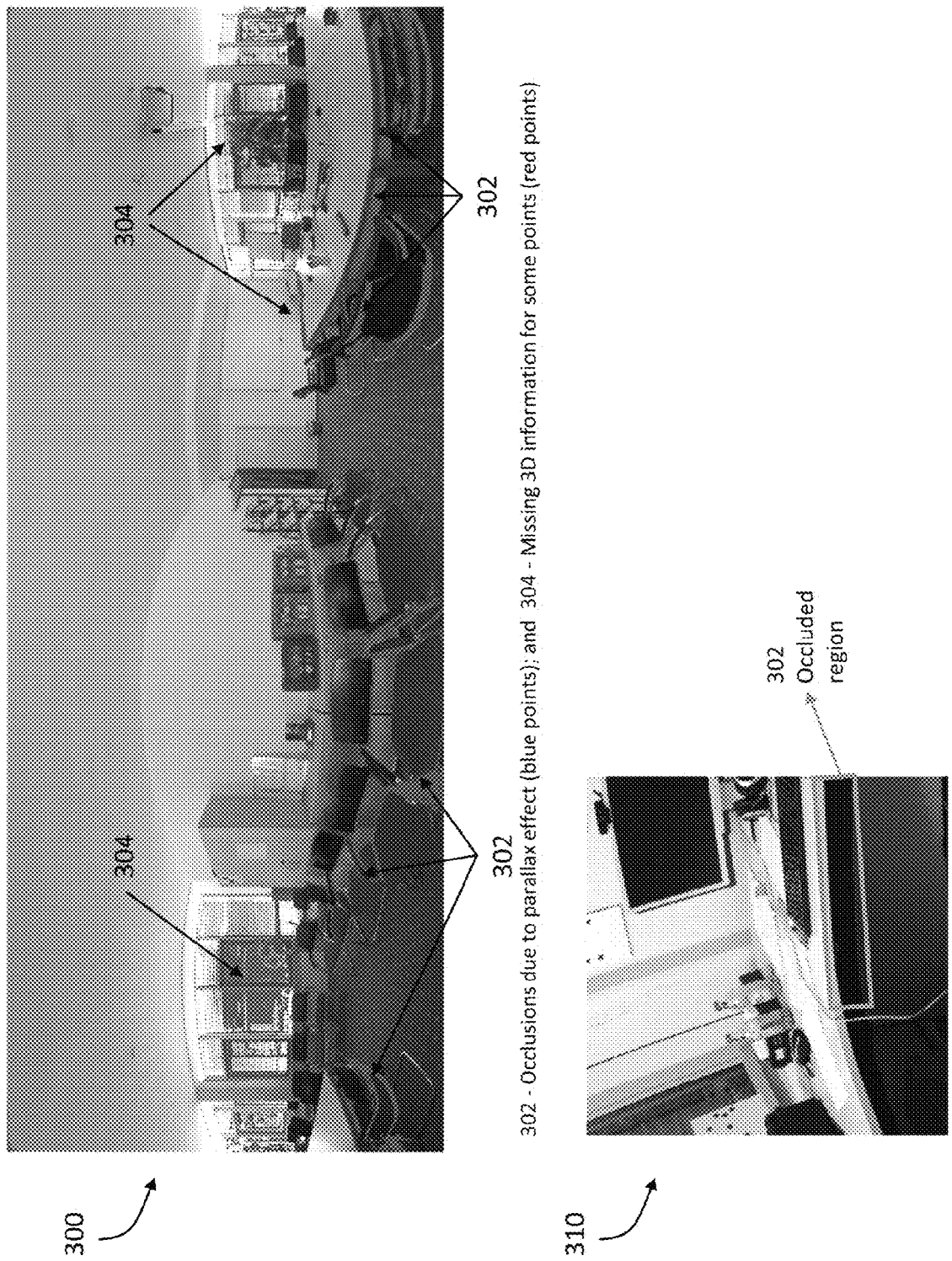
FIG. 5 depicts an example of a 3D scene that is generated without using technical solutions described herein.

FIG. 5 depicts an example of a 3D image that is generated without using technical solutions described herein. The 3D image 300 shows a colorized version of the point cloud captured by the 3D scanner 20, where the scan points from the point cloud are mapped with the colors from pixels of the 2D image. The 3D image is marked with portions 302, 304 with missing information (technical challenge). Particularly, in the example shown, portions 302 include points with missing color information due to occlusion from the camera 66, and portions 304 include points with missing 3D information because of such points being beyond a predetermined distance from the 3D scanner 20. It is understood that while a specific 3D image 300 is shown, several other 3D images can be captured in other examples. As can be seen, because of the technical challenge of the missing information, the portions 302 and 304 are not colorized, and the quality of the 3D image 300 is not as desired. A zoomed-in view of a portion 310 from the 3D image 300 is shown in FIG. 5 to depict an occluded portion 302 with missing color more closely. As can be seen, the uncolored portion 302 makes the 3D image 300 look incomplete.

The technical challenges are addressed by the technical solutions herein by using the machine learning model 152 to add color to the portions 302, 304, at block 212 (see FIG. 4). The machine learning model 152 is a trained deep learning model. In some aspects, the machine learning model 152 is an artificial neural network (ANN) that is trained to generate the color information. In some aspects, the machine learning model 152 uses generative adversarial networks (GAN) with spatial attention. In some examples, the machine learning model 152 can be based on a pyramid-context encoder network. Alternatively, or in addition, the machine learning model 152 can be based on learnable bidirectional attention maps. The machine learning model 152 provides high quality image inpainting by computing the color information for the portions 302, 304. The color information includes a color to be applied to each pixel/point that maps the portions 302, 304. By using the color information computed by the machine learning model 152, the quality of the 3D image 300 is improved.

Training the machine learning model 152 typically requires rich training data, i.e., a large number of instances of training data with ground truth information available. The accuracy of the machine learning model 152 is based on the amount of training data used to train the machine learning model 152. The more scenarios the machine learning model 152 has been trained upon, the more accurate the machine learning model 152 is. As noted earlier, compiling a large training dataset is resource-intensive. Existing inpainting machine learning models based on GANs have such training datasets readily available, or at least practically acquirable. For example, in several existing research works, the researchers have selected a dataset of images and randomly removed parts of the images for creating the dataset for training a machine learning model. However, in these instances, the original dataset of images is available as the ground-truth information for training the machine learning model. However, in the case of the machine learning model 152, for points that are occluded from the 2D camera 66, and the 3D scanner 20, ground truth data cannot be generated, preventing compilation of a completed training dataset. In other words, the images that are used to train the machine learning model 152 in the aspects described herein are inherently incomplete. The camera 66 does not provide the color information in the occluded/missing regions at all. Thus, the ground-truth information is not available for training the machine learning model 152 causing the technical challenging being addressed herein. Therefore, the technical solutions described herein resort to synthetic training data generation techniques.

Accordingly, to address the technical challenge of the unavailability of training data with ground truth, synthetic data is generated for training the machine learning model 152. Technical solutions described herein use a self-supervised training of the machine learning model 152 to compute the missing color information. In some aspects, a supervised image-to-image translation is used for the training.

Figure 6:
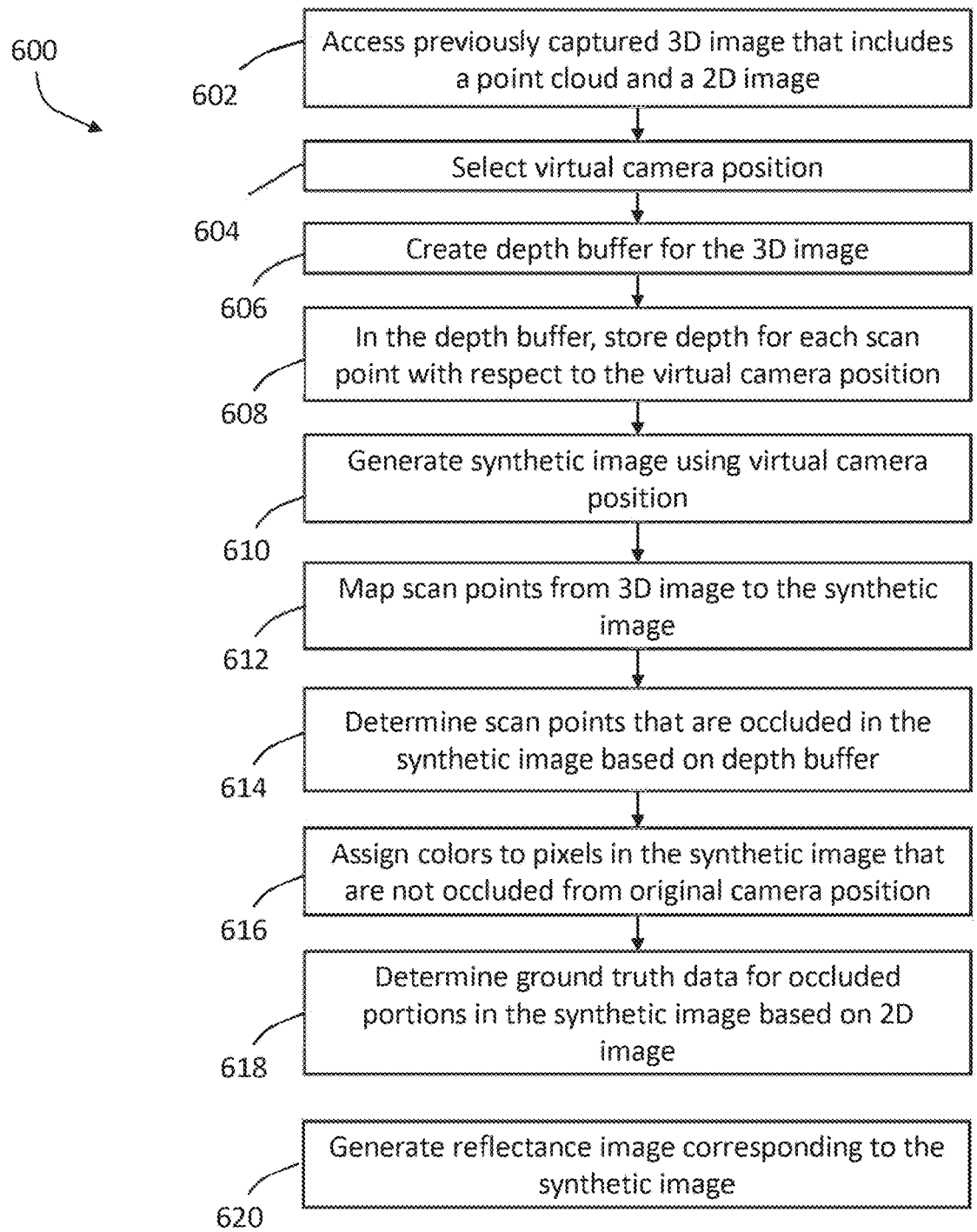
FIG. 6 depicts a flowchart of a method to train the machine learning according to one or more aspects.

FIG. 6 depicts a flowchart of a method to train the machine learning to compute missing color information according to one or more aspects. The method 600 to train the machine learning model 152 is performed in an offline manner prior to executing the method 200. In one or more aspects, the machine learning model is trained using known techniques for training generative neural networks with spatial attention. However, synthetic data is generated for the training to address the technical challenge of the unavailability of the training data.

Figure 7:
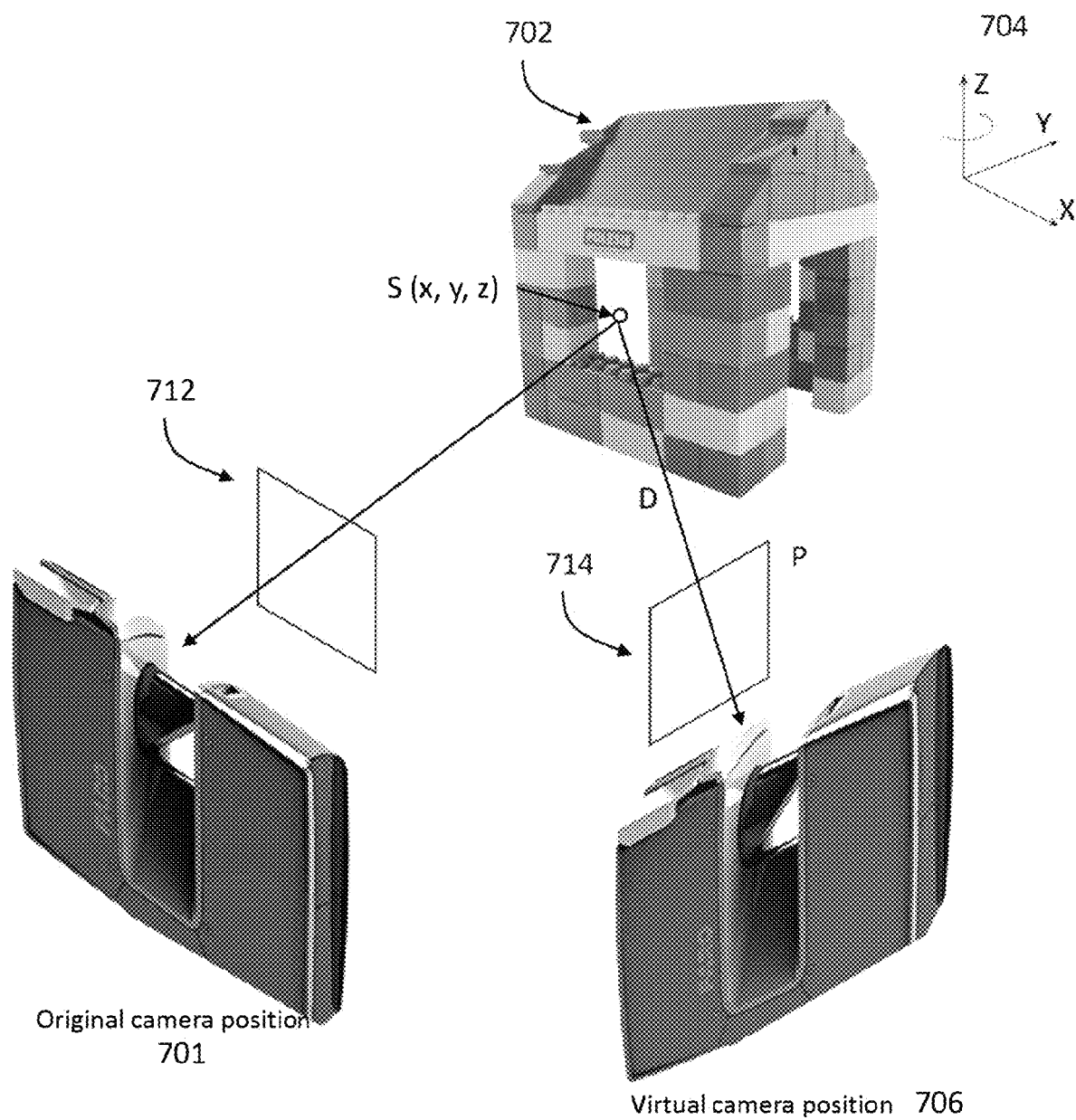
FIG. 7 depicts an example scenario with a 3D image that is used to describe the method from FIG. 6.

At block 602, a previously captured 3D image 700 is accessed. The 3D image 700 includes a point cloud 702 and a 2D image 712. The 3D image may have been captured by the 3D scanning system 100 anytime in the past. In some aspects, the 3D image 700 may be captured by any other device (not a specific 3D scanning system 100). The 3D image 700 is accessed from a database, a file, or any other digital storage device. The 2D image 712 is captured from a camera position, referred to as "original camera position" 701. FIG. 7 depicts an example 3D image 700. The description of the method 600 uses the 3D image 700 as an illustrative example; it is understood that in other aspects, different 3D images are accessed and used.

At block 604, a virtual camera position 706 is selected. The virtual camera position 706 is a 3D coordinate (x, y, z) in the coordinate system 704 of the point cloud 702. The virtual camera position 706 is selected in a stochastic manner in one or more aspects. Alternatively, the virtual camera position 706 can be selected using a predetermined selection process, for example, at a certain width, length, height from the origin of the coordinate system 704. Alternatively yet, the virtual camera position 706 is entered manually.

At block 606, a depth buffer is created corresponding to the virtual camera position 706. A "depth buffer," (or depth map) in computer vision is a data structure that contains information relating to the distance of the points of scene objects in the surrounding environment from the viewpoint from which the points are captured.

At block 608, each scan point S (x, y, z) in the point cloud 702 is back-projected to the virtual camera position 706, and the distance of the scan point from the virtual camera position 706 is used as a depth D for that scan point from the virtual camera position 706. Each scan point is looped over to determine and store the corresponding depth value in the depth buffer. In some aspects, the depth buffer stores a depth value for each scan point S in the point cloud 702.

At block 610, a synthetic image 714 is generated at a plane P using the virtual camera position 706. The dimensions of the synthetic image 714 may vary. In some aspects, the images may restricted to have a certain aspect ratio, for example, 2:1, for accurate backprojection.

At block 612, the scan points S from the point cloud 702 are looped over and back-projected to the plane P to map each scan point S (x, y, z) to a corresponding pixel (p, q) of the synthetic image 714. At block 614, occluded scan points are detected based on the depth values. If two or more scan points S1 and S2, map to the same pixel in the synthetic image 714, at least one of the scan points S1 and S2 is deemed to be occluded from the virtual camera position 706. The scan point (say S2) that is occluded can be determined based on disparities in the respective depth values of the scan points S1 and S2. In other words, if two or more scan points map to the same pixel value in the synthetic image 714 then the scan point which has a greater depth value is considered to be occluded. For example, the scan point S2 with a larger depth value can be deemed to be occluded from the camera 66 at the virtual camera position 706. Accordingly, at block 614, a set S' of scan points in the point cloud 702 that are occluded from the virtual camera position 706 is identified. The rest of the scan points S" (other than S') are mapped to corresponding pixels in the synthetic image 714. The occluded scan points S' represent scan points, and corresponding pixels in the synthetic image 714, for which color information is missing (in the synthetic image 714). cannot be determined.

At block 616, the occluded scan points S' are back-projected to the original camera position 701. In other words, colors are assigned to pixels in the synthetic image that are not occluded from original camera position. The scan points S' which are occluded from the virtual camera position 706 are back-projected to the original camera position 701 to mimic the parallax effect accurately which results from the external camera 66 not being in the same coordinate system as the laser of the scanner 30. The color for the occluded scan points S' can accordingly be determined from the captured 2D image 712. Accordingly, ground truth for the occluded scan points S' is now available.

At block 618, the scan points S" that are mapped to the pixels in the synthetic image 714 are back-projected to the original camera position 701. The color for the pixels in the synthetic image 714 can be determined from the 2D image 712. Accordingly, the synthetic image 714 includes portions that are deemed to be visible from the virtual camera position 706, and which are assigned colors from the captured 2D image 712; and portions that are deemed to be occluded from the virtual camera position 706, but for which ground truth color information is known based on the 2D image 712.

Figure 8:
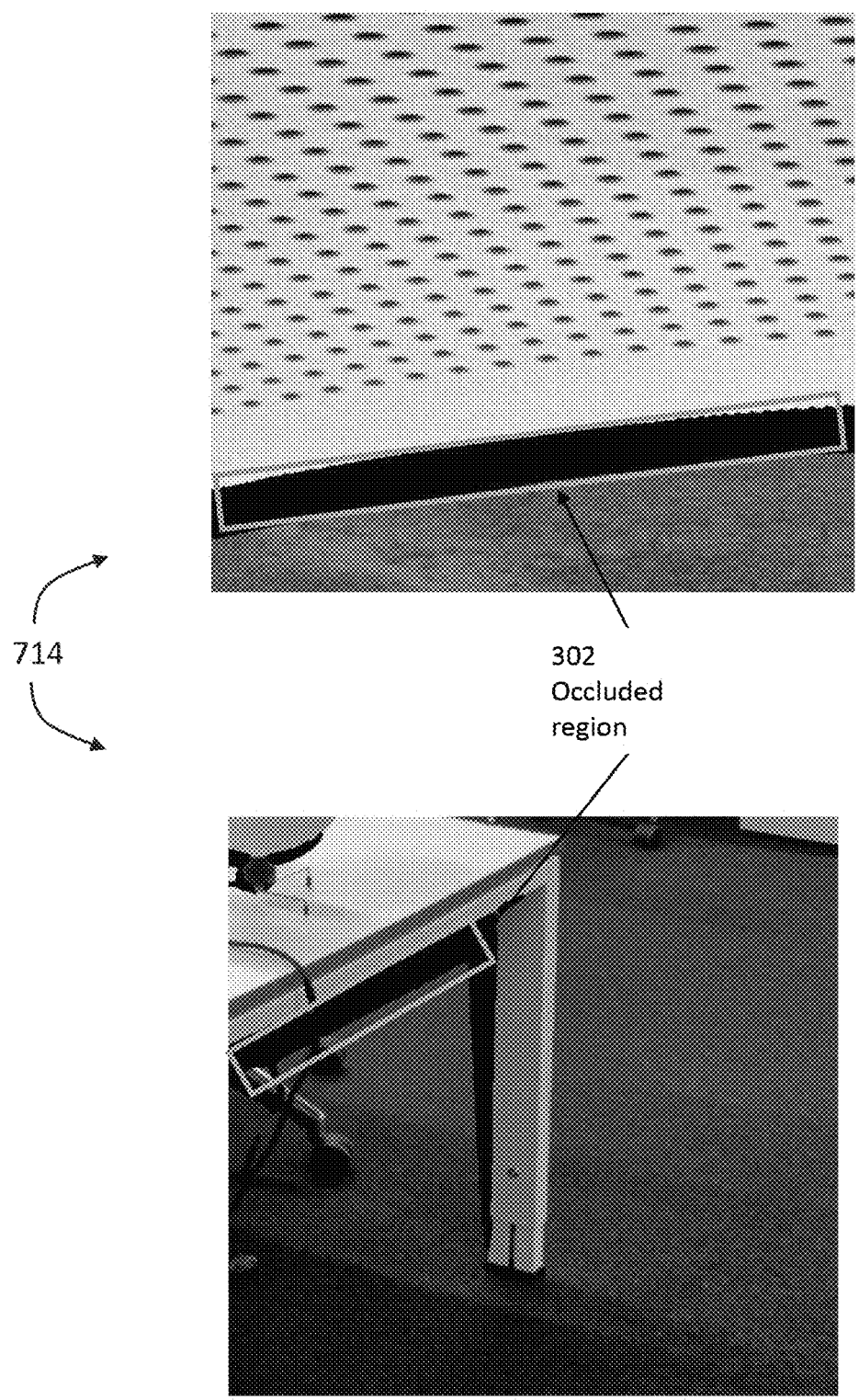
FIG. 8 depicts example synthetic images generated using one or more aspects described herein.

FIG. 8 depicts example synthetic images 714 generated in this manner. In one or more aspects, the synthetic image 714 of a predetermined dimension is generated, for example, 512×512 pixels. Any other dimension can be used in other aspects.

In one or more aspects, the operations in blocks 602-618 of the method 600 are executed as many times as required to generate a predetermined number of synthetic images 714. The synthetic images 714, with the ground truth data for occluded regions 302, provide the testing data for training the machine learning model 152. In some aspects, the same 3D image can be accessed to generate multiple synthetic images 714 to be used for the training. In other aspects, different 3D images are accessed (in 602) to generate the synthetic images 714.

At block 620, a reflectance image 802 is generated corresponding to the synthetic image 714. The reflectance image 802 is generated based on an intensity (gray-scale) image that is captured by the 3D scanner 20 when capturing the point cloud. The intensity image provides an amount of light that is received by the 3D scanner when capturing the point cloud. In one or more aspects, the reflectance image 802 is generated by back-projecting the scan points S" that map to the pixels of the synthetic image 714 onto the intensity image from the 3D scanner 20. The back-projected pixels in the intensity image provide the intensity values to be assigned to the pixels of the reflectance image 802.

At block 622, an occlusion mask 804 is generated based on the synthetic image 714 and the reflectance image 802. The occlusion mask identifies the occluded portions 302 in the reflectance image 802. The occluded portions 302 are the same pixels as those pixels in the synthetic image 714 that are missing color information.

Figure 9:
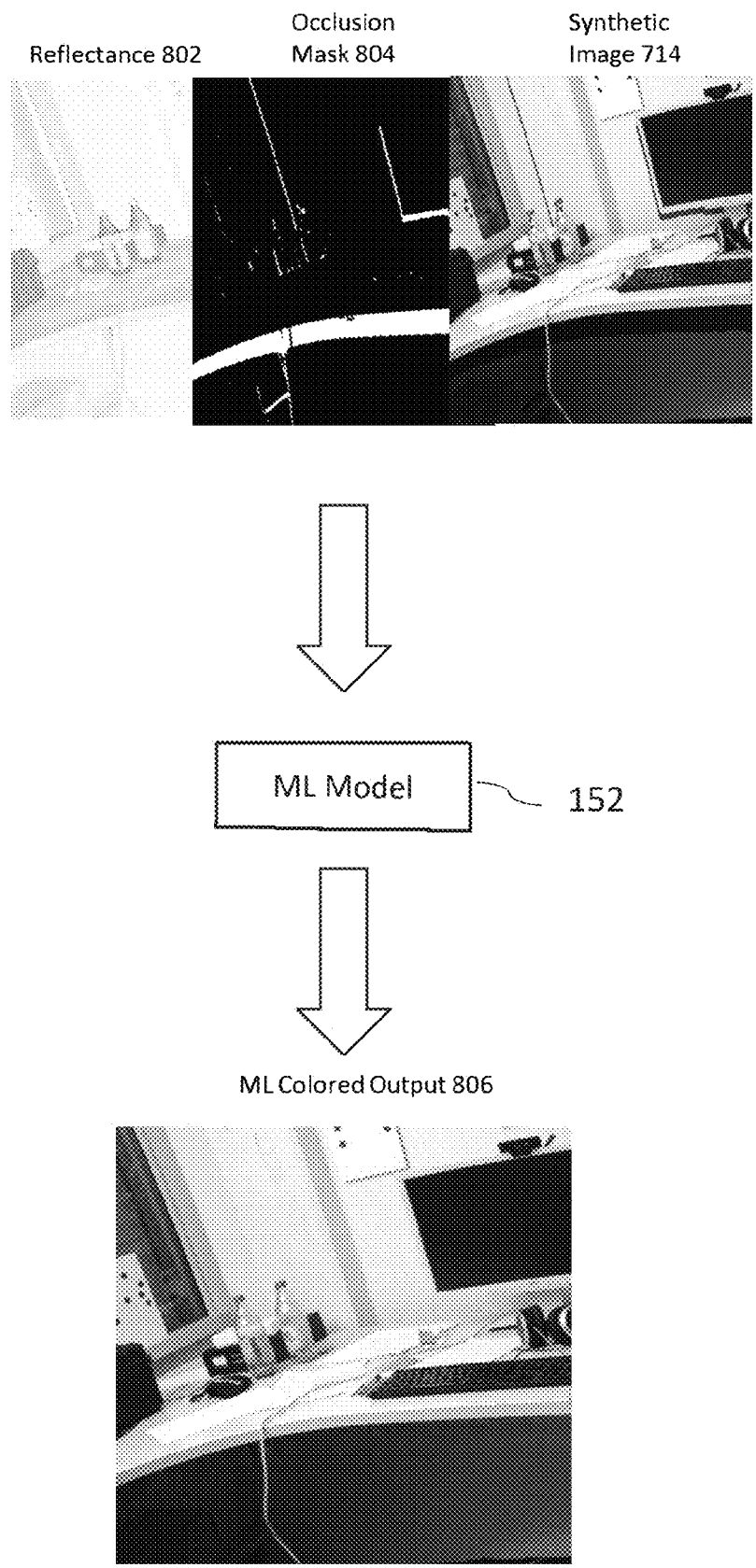
FIG. 9 depicts an example training stage according to one or more aspects described herein.

At block 624, the machine learning model 152 is trained using the training dataset that includes multiple synthetic images 714. FIG. 9 depicts an example training stage according to one or more aspects. In the depicted training stage, the machine learning model 152 is input the synthetic image 714, the reflectance image 802, and the occlusion mask 804.

The machine learning model 152, for example, a GNN, estimates colors for the occluded portions 302 in the synthetic image 714 based on the reflectance image 802 and the occlusion mask 804, and generates an output image 806 with the occluded portions 302 colored. The colors of the occluded regions 302 in the output image 806 are compared with the ground truth data (based on back-projection in the 2D image 712). If the error (i.e., difference) is not within a predetermined threshold, the parameters (e.g., weights) of the machine learning model 152 are adjusted, and the training is repeated with the updated parameter values. The output generation, comparison, and parameter adjustment continue until the error is within the predetermined threshold.

The training of the machine learning model 152 is repeated for N (predetermined number) of synthetic images 714. The trained machine learning model 152 is then deployed on the computer 150 or any other computing device that generates (block 212 of method 200) the missing color information that cannot be captured during scanning.

In one or more aspects, generating the missing color for the captured 2D image is performed using a sliding window.

Figure 10:
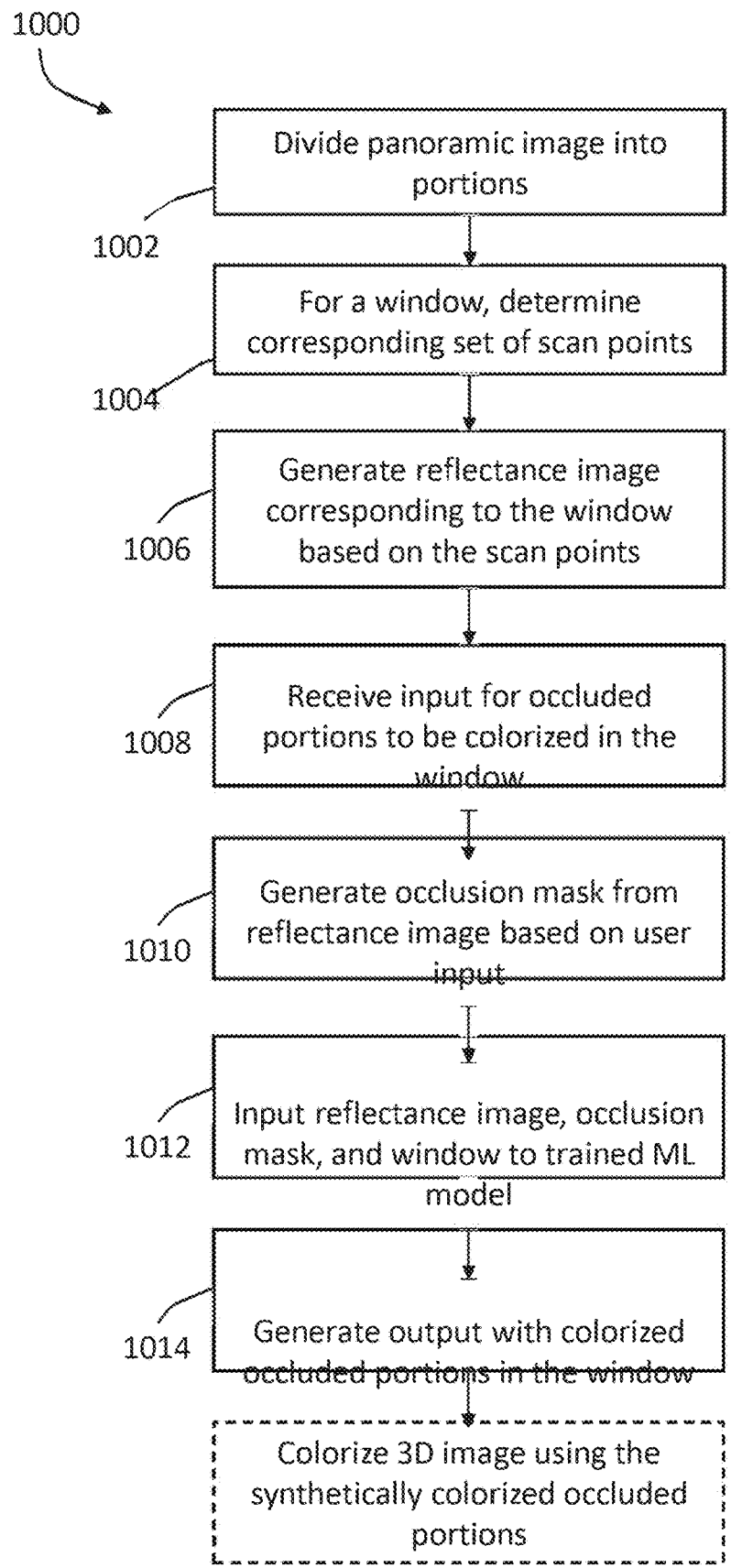
FIG. 10 depicts a flowchart of a method to generate the missing color in a panoramic image based on machine learning according to one or more aspects described herein.

FIG. 10 depicts a flowchart of a method 1000 to generate the missing color in a panoramic image based on machine learning according to one or more aspects. The method 1000, in some aspects, represents operations that are performed as part of block 212 of the method 200 in FIG. 4. Accordingly, at the start of the method 1000, a point cloud and a 2D image of the surrounding environment are captured, and a 3D image has been generated in which occluded portions 302 are to be colorized. At block 1002, the panoramic 2D image that is captured is divided into X portions, referred to as "windows" of a predetermined dimension (e.g., 500×500 pixels). Here, X can be an integer. In some aspects, when X=1, the entire image is used at one. Alternatively, X can be set to a predetermined or a configurable value, such as 4, 8, etc.

For each window, a corresponding set of scan points from the point cloud are determined at block 1004. Using the corresponding set of scan points, a reflectance image 802 corresponding to the window is determined, at block 1006.

In some aspects, at block 1008, an operator identifies the occluded portions 302 that are to be colorized in the 3D image in the portion that corresponds to the window. The operator marks the regions to be considered the portions 302 in the color image. For example, the operator can use a selection tool via a user interface, for example, a mouse, a keyboard, a touchscreen, a digital pen, or any other such input device.

At block 1010, based on the marked occluded portions 302, occlusion mask 804 is generated using the reflectance image 802. The reflectance image 802, the occlusion mask 804, and the window are input to the trained machine learning model 152, at block 1012. At block 1014, the machine learning model 152 generates an output window with the marked occluded portions 302 being assigned colors (i.e., colorized) based on the training.

The above operations of colorizing occluded portions 302 is repeated for each window of the captured panoramic 2D image. Using the sliding window approach improves the process by reducing the resources and time required to colorize the occluded portions 302 by being able to handle smaller portions of the 2D image. Because smaller portions are being handled, the amount of data that has to be analyzed reduces, and in turn, the requirement of computational resources such as memory, processor, is also reduced. It should be noted that in some cases, the entire 2D image can be operated upon by using only a single window, i.e., the entire 2D image as input.

Once each window is processed in this manner, the occluded portions 302 in the 2D image are colorized synthetically using the trained machine learning model 152. The improved and synthetically colorized 2D image is then used to update the 3D image to colorize the occluded regions.

In some aspects, to improve the execution of the trained machine learning model 152, a cube map representation of the panoramic 2D image is used for inputting and processing the entire panoramic 2D image at once (instead of the sliding window approach). Various conversions from equirectangular projection to/from cubic projection can be used for such improvements.

Referring back to the method 200 of FIG. 4, at block 214, the 3D image 300 is updated using the occluded portions 302 that are synthetically colorized by the machine learning model 152. The update improves the 3D image 300 by filling in at least some of the missing color information that the camera 66 was unable to capture.

It should be noted that in some aspects, the 3D image is generated (block 210) only after the occluded portions 302 are colorized by the trained machine learning model 152 (block 212). Similarly, various other operations in the various methods described herein can be performed in sequences different from those depicted in the corresponding flowcharts, unless a specific sequence is explicitly mentioned or called for.

FIG. 11 and FIG. 12 depict example scenarios without and with using technical solutions described herein when generating 3D images using the 3D measurement device 100. In FIG. 11, the points occluded from the camera 66 in window 1102 are filled in using the trained machine learning model 152 to generate the updated window 1104. In FIG. 12, an entire panoramic image 1202 is updated by the machine learning model 152 to generate an updated panoramic image 1204 by colorizing several occluded regions. The panoramic image 1102 may be updated using the sliding window approach described herein.

As can be seen, the technical aspects described herein address the technical challenges of missing color information discussed herein and improve the operation of the 3D measurement device 100. Not only do the technical solutions described herein address the technical challenge and improve the working of the 3D measurement device, but they also provide a practical application of capturing a 3D image with better quality than a 3D image acquired without compensating for missing color information.

Figure 13:
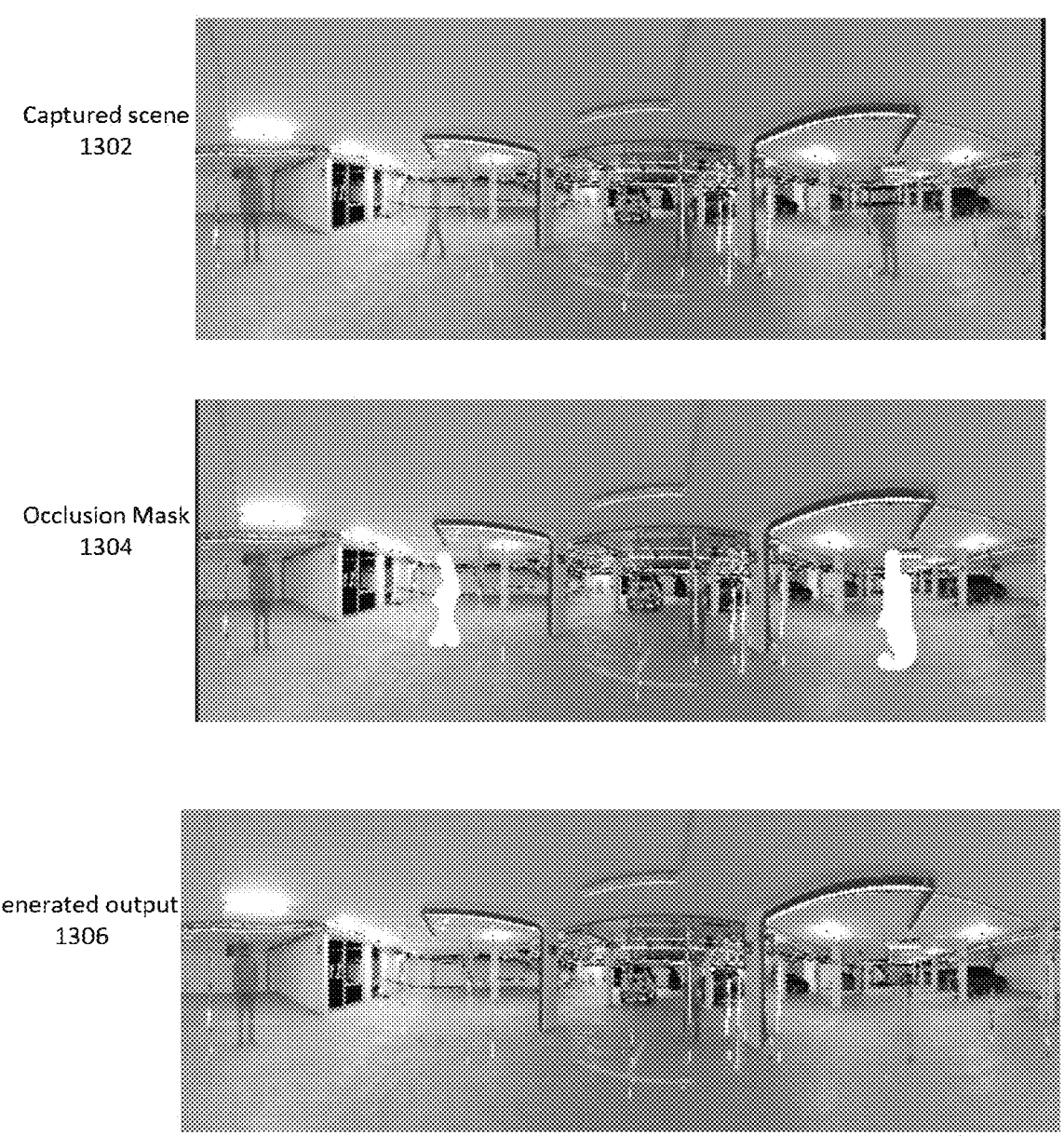
FIG. 13 depicts an example scenario in which technical solutions described herein are used to remove an unwanted artifact from a scene.

Further, in one or more aspects, the technical solutions described herein can be used to remove unwanted artifacts from a 2D or 3D image. Such unwanted artifacts can include faces, license plates, identification signs, nameplates, street names, or any other such portions captured in an image. To facilitate such a removal, the operator can select the portion to be removed (at block 1008 in FIG. 10). FIG. 13 depicts an example where a captured scene 1302 includes an artifact, in this case, a person, that is to be removed from the captured scene 1302. For example, the person may have entered the frame of capture, i.e., the field of view of the scanning system by mistake. The operator can select the artifact to provide an occlusion mask 1304. As described herein, the occlusion mask 1304, the captured image 1302, and reflectance image (not shown) can be used by the trained machine learning model 152 to provide a generated output image 1306 with the artifact removed. In place of the removed object, the estimated color from the captured scene 1302 is used by the trained machine learning model 152 to provide a smooth, high quality, artifact-free output image 1306.

Aspects described herein can be used within the process of coloring a point cloud that is captured by the scanner 20, at least in the following modes: static scanning, and dynamic scanning (e.g., scanning while moving, such as with the SWIFT® Scanning System manufactured by FARO Technologies, Inc. of Lake Mary, Florida, USA).

It should be appreciated that while aspects herein describe the reduction of the image point residuals with reference to the use of the camera with the ultrawide-angle lens and a three-dimensional scanner, this is for example purposes, and the claims should not be so limited. In other aspects, the residual reduction could be used in other applications that use an omnidirectional camera, or a camera with a single ultrawide-angle lens to improve the accuracy of the image.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of aspects, it should be readily understood that the invention is not limited to such disclosed aspects. Rather, the invention can be modified to incorporate any number of variations, alterations, substitutions or equivalent arrangements not heretofore described, but which are commensurate with the spirit and scope of the invention. Additionally, while various aspects of the invention have been described, it is to be understood that aspects of the invention may include only some of the described aspects. Accordingly, the invention is not to be seen as limited by the foregoing description but is only limited by the scope of the appended claims.

What is claimed is:

1. A system comprising:
a three-dimensional (3D) scanner;
a camera with a viewpoint that is different from a viewpoint of the 3D scanner; and
at least one processor coupled with the 3D scanner and the camera, the at least one processor configured to:
access a point cloud captured by the 3D scanner, the point cloud comprises depth values of points in a surrounding environment;
access a 2D image captured by the camera, the 2D image comprises a plurality of pixels representing color information of the points in the surrounding environment;
generate a 3D scene by mapping the point cloud with the 2D image;
receive an input that selects, from the 3D scene, a portion to be colorized synthetically;
colorize the one or more points in the selected portion in the 3D scene, the colorizing comprising:
generating a reflectance image based on an intensity image of the point cloud;
generating an occlusion mask that identifies the selected portion in the reflectance image; and
estimate, using a trained machine learning model, a color for each of the one or more points in the selected portion based on the reflectance image, the occlusion mask, and the 2D image; and
update the 3D scene by using the estimated colors from the trained machine learning model to colorize the selected portion.

2. The system of claim 1, wherein the trained machine learning model is a generative adversarial neural network.

3. The system of claim 1, wherein the 2D image is a panoramic image.

4. The system of claim 1, wherein the 3D scene comprises a plurality of occluded regions, and each occluded region is colorized using a sliding window.

5. The system of claim 1, wherein colorizing the occluded portion of the 3D scene comprises transforming the 2D image into cube map representation.

6. The system of claim 1, wherein the selected portion is an occluded portion of the surrounding environment that is visible from the 3D scanner, and is not visible from the camera.

7. The system of claim 1, wherein the selected portion is an artifact that is to be removed from the 3D scene.

8. The system of claim 1, wherein the trained machine learning model is trained using synthetically generated data from previously captured 3D images.

9. A computer-implemented method comprising:
accessing a point cloud captured by a 3D scanner, the point cloud comprises depth values of points in a surrounding environment;

accessing a 2D image captured by a camera, the 2D image comprises a plurality of pixels representing color information of the points in the surrounding environment;

generating a 3D scene by mapping the point cloud with the 2D image;

receiving an input that selects, from the 3D scene, a portion to be colorized synthetically;

colorizing the one or more points in the selected portion in the 3D scene, the colorizing comprising:

generating a reflectance image based on an intensity image of the point cloud;

generating an occlusion mask that identifies the selected portion in the reflectance image; and estimating, using a trained machine learning model, a color for each of the one or more points in the selected portion based on the reflectance image, the occlusion mask, and the 2D image; and updating the 3D scene by using the estimated colors from the trained machine learning model to colorize the selected portion.

10. The computer-implemented method of claim 9, wherein the 2D image is a panoramic image.

11. The computer-implemented method of claim 9, wherein the 3D scene comprises a plurality of occluded regions, and each occluded region is colorized using a sliding window.

12. The computer-implemented method of claim 9, wherein colorizing the occluded portion of the 3D scene comprises transforming the 2D image into cube map representation.

13. The computer-implemented method of claim 9, wherein the selected portion is an occluded portion of the surrounding environment that is visible from the 3D scanner, and is not visible from the camera.

14. The computer-implemented method of claim 9, wherein the selected portion is an artifact that is to be removed from the 3D scene.

15. The computer-implemented method of claim 9, wherein the trained machine learning model is trained using synthetically generated data from previously captured 3D images.

* * * * *